Oct. 31, 1950  C. W. LA RUE  2,527,743
FISHING LURE
Filed Feb. 9, 1946
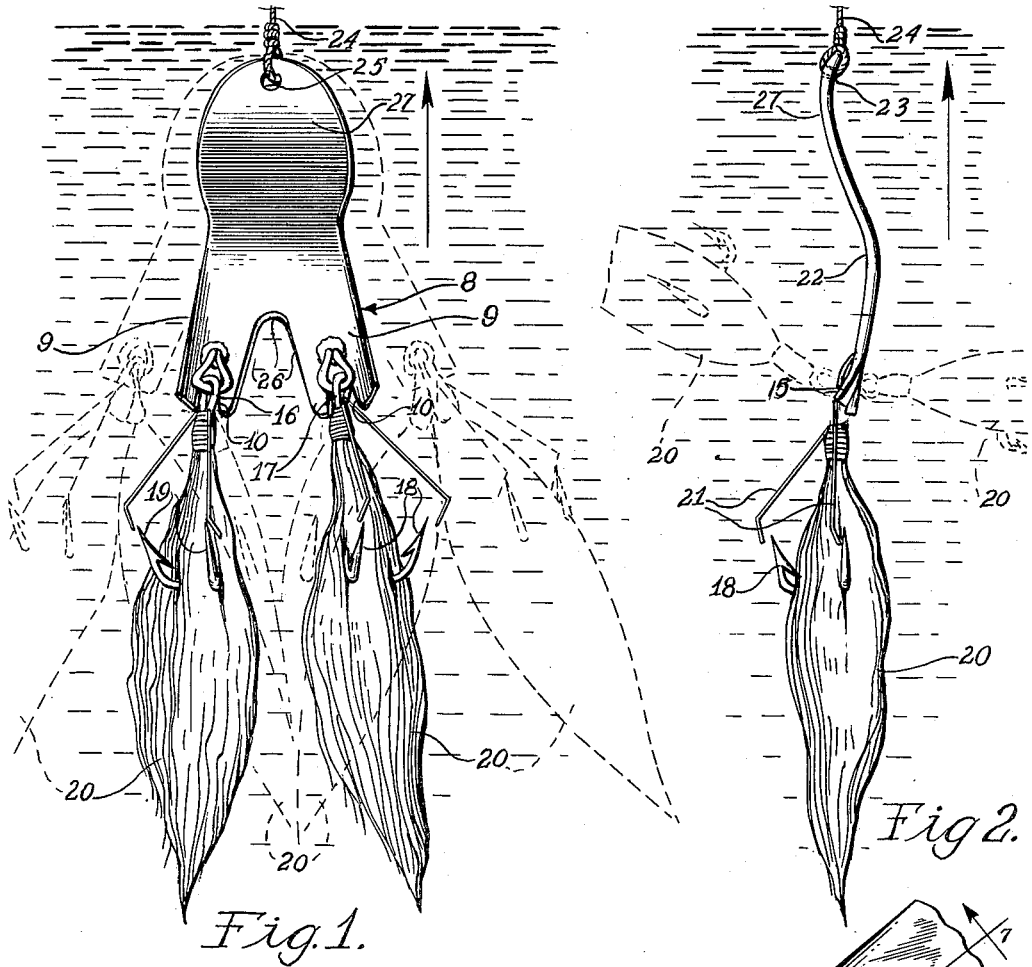
Fig. 1.  Fig. 2.
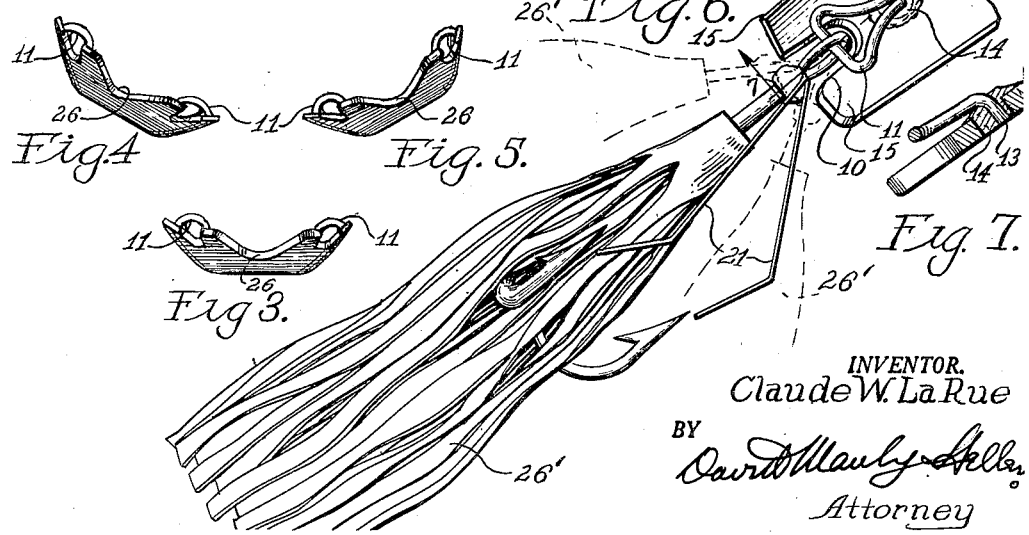
Fig. 4.  Fig. 5.  Fig. 6.  Fig. 7.
Fig. 3.
INVENTOR.
Claude W. La Rue
BY
Attorney Patented Oct. 31, 1950

2,527,743

UNITED STATES PATENT OFFICE 2,527,743

FISHING LURE

Claude W. La Rue, Chicago, Ill.

Application February 9, 1946, Serial No. 646,524

1 Claim. (Cl. 43—42.52)

My invention relates to fishing lures and is of the spoon variety.

An important object of my invention is to provide a fishing lure, which will be subjected to a wobbling action about its longitudinal axis, and a wiggling action taking place simultaneously with the said wobbling action; the said lure being provided with means to provide the wiggling action, and means to provide simultaneously the said wobbling action, the wiggling action occuring in a horizontal plane, whereas the wobbling actions occur axially longitudinally with respect to the said horizontal plane in which the wiggling action takes place.

The conventional lure utilizes split rings to fasten the hooks, consequently the lure would not possess a wobbling action because of the stabilizing effect of the balance afforded by the hooks. Moreover, the hooks would tangle in casting operations doubling over on the ring resulting in "fouling" the lure because the fish would not and could not be hooked on tangled hooks. Hence a prime object of my invention is to provide an efficient weedless fishing lure which will hook "strikes," whereas other lures, especially those equipped with hooks on each side of the rear portion thereof, would "foul" and tangle; my lure being capable of a wobbling action in defiance of the stabilizing effects of twin hooks which will not tangle with each other nor with their respective mountings.

Another object of my invention is to provide in a fishing lure, dual hook mounting means affording the hooks complete arcuate longitudinal action and limited transverse action so as to prevent tangling of the hooks.

Another object of my invention is to provide a substantially central body hump or bent portion substantially in the central portion of the body of the said fishing lure, which will subject the lure, when retrieved through the water, to a wobbling action.

A still further object of my invention is to provide an angularly slotted portion at the tail end of the lure, which will subject the same to a wiggling action in the horizontal plane of movement.

Another object of my invention is to provide a practically constructed lure, which provides considerable animation when retrieved, and which is so simply constructed as to warrant economical manufacture thereof in quantity production.

Other features, and ancillary objects inherent in my invention will become readily apparent from an examination of the accompanying drawings, having particular reference to the ensuing description, wherein like symbols are used to designate like parts, and in which;

Fig. 1 represents a top plan view of my invention.

Fig. 2 is a side view thereof.

Fig. 3 is a rearward end view thereof with the hooks removed.

Figs. 4 and 5 represent the approximate limitation of the wobbling action produced when my lure is retrieved through the water.

Fig. 6 is an enlarged showing of the method of mounting the hook at the tail end of my fishing lure, and;

Fig. 7 is a sectional view of Figure 6, on line 7—7.

Referring to the various views, my invention is, generally, designated 8, and consists of an upper arcuately-shaped head portion 27, and lower leg portions 9 which are separated by means of the angularly cut notch portion 26. Each leg 9 is recessed as indicated at 10, resulting in stop lugs 15, and has suitable eye mountings 11, their ends 12 being secured, within a suitable recess after being bent over as indicated at 13, by spot-welding 14, or other suitable means furnishing a firm assemblage.

The said eye 11, provides a support on which are articulately mounted the eyes 16 or 17 of the hook elements 18 and 19, respectively, the eyes 16 or 17 being mounted on the said eyes 11.

The hooks may be provided with weedless safety guards 21 to prevent weeds from accumulating on the lure or on the hooks 18 and 19 respectively. By virtue of this mounting, the hooks 18 and 19 are afforded a transverse movement in a horizontal plane of limited magnitude, so that the said hooks 18 and 19 will not become entangled, at the same time the hooks are afforded a perpendicular movement to the horizontal plane, of rather wide scope as indicated in Figure 2.

The hooks may carry various forms of dressing, such as, animal's hair dressing, or bucktail 20 as indicated in Figures 1 and 2, or as indicated in Figure 6, the dressing may be a rubber streamer 26'.

The action of the lure when it is retrieved in the water subsequently to having been cast, working in the direction of the arrows indicated in Figures 1 and 2, will be subjected to the alternate wobbling action indicated by the angularly positioned limitations of Figures 4 and 5, simultaneously therewith, the lure, by virtue of the angularly notched portion 26, will be subjected to wiggling in a horizontal plane indicated by the dotted positions of Figure 1.

The hooks 20 will also be subjected to action in the plane of the wiggling action as indicated by the dotted line in Figure 1, and will have freedom of action in a plane perpendicular to the horizontal plane as indicated by the dotted lines of Figure 2, the slowness or rapidity of retrieve affecting the action, for example, if the retrieve is rapid the wobbling and wiggling action will be more rapid than when the retrieve is slowed up.

The action of the lure can be modified by varying the bent or hump portion 22 so as to increase the wobbling action, or decrease it, and by varying the depth of the notched portion 26, the wiggling action may be modified tending to increase or decrease the same. Likewise, various modifications with respect to the action of the lure may be made by the dressing 20 applied thereto, a heavier dressing as indicated at 27 where the rubber streamers are used, will affect, or modify, the wobbling and wiggling actions of the said fishing lure.

It may also be found advisable to subject the lure body, generally designated 8, to a torsional twist, whereby the plane of the legs 9 will be in angular relation to the head portion 27, and to some extent that would also have some effect on the wobbling and wiggling actions.

The fishing line 24 attaches to the lure body by virtue of a hole 25 in the head portion thereof, the said portion at the extreme tip being slightly bent as indicated at 23 to form a nose to agitate the water during retrieve through the water, and to some extent aiding the wiggling and wobbling action heretofore mentioned.

Although, I have herein described, rather succinctly, the nature and operation of my fishing lure, and inasmuch as the same is susceptible of various modifications and improvements, I hereby reserve the right to all such modifications and improvements coming within the scope and spirit of my invention, as well as those embraced impliably or suggestively in the accompanying drawings, and also all those that may fall within the purview of the foregoing description.

Having thus described and revealed my invention, what I claim as novel, and desire to secure by Letters Patent, is:

A fishing lure of the character described comprising a body having a front nose portion, a substantially central and laterally offset hump portion, and a notched tail portion resolved into two leg portions in torsionally twisted relationship to the said nose portion, each of the said leg portions being provided with a recess the walls of the said recesses providing stop means, eye means secured above the roots of the said recesses and overlapping the same, and hooks articulately mounted on the said eye means, the said hooks being capable of longitudinal and limited horizontal movements by virtue of the said stop means acting as abutments to the lateral movements thereof.

CLAUDE W. LA RUE.

REFERENCES CITED

The following references are of record in the file of this patent:

UNITED STATES PATENTS

| Number | Name | Date |
| --- | --- | --- |
| 1,317,890 | Patton | Oct. 7, 1919 |
| 1,425,951 | Eggleston | Aug. 15, 1922 |
| 1,738,617 | Scharrer | Dec. 10, 1929 |
| 1,851,529 | Stapf | Mar. 29, 1932 |
| 1,866,465 | Harrington et al. | July 5, 1932 |
| 1,997,802 | Meyer | Apr. 16, 1935 |